Patented Apr. 8, 1941

2,237,634

UNITED STATES PATENT OFFICE 2,237,634

PHENOL MODIFIED RESINS AND PROCESS FOR THEIR PREPARATION

Raphael Rosen, Elizabeth, N. J., assignor to Standard Oil Development Company, a corporation of Delaware No Drawing. Application December 29, 1937, Serial No. 182,241

17 Claims. (Cl. 260—43)

This invention relates to the production of improved phenol modified resins from aromatic hydrocarbons and aldehydes. The condensation of phenol with aromatic hydrocarbons and aldehydes has previously been observed to form black, pitch-like insoluble and infusible condensation products.

It has now been found that improved soluble and fusible products may be obtained by suitably controlled condensation of these reagents.

It has also been found that superior resins are obtained from selected petroleum fractions which are substantially free of olefines and oxygen compounds.

It has also been found that condensation products of greatly improved solubility in certain solvents, such as drying oils, can be obtained when using alkyl phenols, preferably having 4 or more carbon atoms in an alkyl group, instead of phenol in this process.

Other and further objects of this invention will be apparent from the following description and the claims:

The following examples illustrate suitable methods for carrying out the process of this invention and for preparing the products described herein:

Example I 400 cc. of sulfuric acid of 80% strength was added to 500 cc. of an aromatic petroleum fraction boiling between 132 and 142° C. and obtained by extraction with liquid sulfur dioxide of a virgin naphtha distillate of Conroe petroleum. 250 cc. of formalin were then added to the solution and the resulting mixture was heated to 80° C. for 1½ hours, until substantially all the formaldehyde had reacted, as indicated by the absence of formaldehyde odor. 250 cc. of phenol were then added and the mixture heated and stirred at 80° C. for 10 minutes. 110 cc. of additional formalin were then added with stirring and continued heating for 1 hour until the mixture became too thick to stir. The mixture was then permitted to cool and ethyl ether was added. The resulting ether solution was separated from the aqueous layer and then ether was distilled off to a still temperature of 250° C. at 20 millimeters mercury absolute pressure. The resulting distillation residue was found to be a dark red, brittle resin. It was 99.23% soluble in benzene, had a melting point of 75° C. (method of Robert Pauh, Inc.) and was partially soluble in tung oil.

Example II

A resin was prepared in the same manner as described in Example I except that tertiary amyl phenol was used in place of the phenol of Example I. The resulting resin had a dark red color and a melting point of 70° C. It was substantially completely soluble in benzene and also in tung oil. The composition of the resin in tung oil was suitable for use as a varnish, although it dried rather slowly. Drying accelerators may be added to offset this.

The resins obtained in Examples I and II are substantially stable and show little heat-hardening properties. Resins having such properties are obtained when the resins are prepared in the same manner, provided the finishing temperatures are kept low. For example, a resin was prepared in the same manner as described in Example I, except that the vacuum distillation of the ether solution was stopped at 100° C. The resin thus obtained as the distillation residue had a melting point of 60° C. On heating this resin to 185° C. for 15 minutes, its melting point increased to 100° C. If the resin is mixed with hexamethylene-tetramine before the heating treatment, resins of even higher melting point are obtained thereby.

On the other hand, if the reaction time in the preparation of the resins is made shorter, much softer products ranging from viscous oils to plastic solids are obtained.

If, in the preparations described in the above examples, the phenol is added to the initial reagents prior to condensation, a very brittle, insoluble resin is obtained. The addition of the phenol only after the initial condensation of hydrocarbon and aldehyde is substantially complete produces resins of greatly improved solubility.

While the resins described herein may be prepared generally from aromatic hydrocarbons and mixtures thereof, aromatic petroleum fractions have been found especially suitable for use in this invention.

These aromatic petroleum fractions may be obtained from relatively highly aromatic petroleum, and from the aromatic extracts obtained by treating petroleum oils with solvents having a selective action between the aromatic and paraffinic components of the oil. Examples of such solvents are liquid sulfur dioxide, phenol, nitrobenzene, benzol-acetone, furfural, and the like, which selectively dissolve the aromatic components. Liquefied propane, and other solvents which selectively dissolve the paraffinic components, may also be used, in this case the aromatic fraction being obtained as the raffinate.

The aromatic petroleum fractions used in this invention boil preferably within the approximate limits of 125 and 275° C. Still higher boiling fractions may be used but the resins obtained therefrom are generally poor in color. Also fractions boiling below 125° C. may be used. These, however, have been found to be relatively difficultly reactive and may require somewhat higher reaction temperatures. For example, when using 10% zinc chloride in acetic acid as the catalyst, such fractions require the use of reaction temperatures of about 135° C. The reaction may be conducted under pressure in order to attain this temperature in liquid phase. This disadvantage may be diminished by carrying out the reaction at lower temperatures in the presence of more active catalyst combinations which will be described below.

The aromatic petroleum fractions used in this invention preferably have an aniline point below about 10° C. and preferably have an aromatic content above about 80% by the Kattwinkel test. These fractions are preferably free from olefins, sulfur, and oxygen compounds. While cracked products may be used, it is preferable to remove the olefins therefrom by suitable pre-treatment with aluminum chloride and/or sulfuric acid when resins of light color and high quality are desired. It is preferable to treat all the aromatic fractions used with absorptive clays, as by percolation through the clay, shortly before they are used in the resin-forming process. This pretreatment is especially desirable if the aromatic fractions have been exposed to air or light for any length of time. The oils may also be treated with caustic soda, in either aqueous or alcoholic solution or in solid form. In using such treatments, care should be taken to remove all traces of caustic soda from the oil before the resin-forming reaction. An especially suitable method for this treatment is to distill the oil over solid caustic soda.

The condensation may also be conducted with other alkyl phenols having preferably from 4 to 6 or more carbon atoms in an alkyl group, such as the butyl, amyl, and hexyl phenols. Those in which the alkyl groups are secondary or tertiary are preferred. The phenols may contain more than 1 alkyl group, as in dibutyl phenol, amyl cresol, and the like, and may also contain more than 1 hydroxyl group as in resorcinol. Also phenolic compounds containing more than 1 aromatic nucleus, such as aryl phenols, phenyl phenol, and those containing condensed nuclei, such as naphthol and alkylated naphthols, may be used. It is preferable to have at least two unsubstituted positions in the hydroxy-aromatic nucleus.

The condensation reaction is preferably conducted in the presence of acidic condensation catalysts. While sulfuric acid has been shown in the above examples, similar preparations may also be conducted with aluminum chloride, zinc chloride, ferric chloride, and the like. It is advantageous in preparing resins of light color to use mixtures of such condensing agents with acids having dissociation constants for the first hydrogen ion of about 10 to −1 to 10 to −7. Examples of such acids are acetic acid, butyric acid, propionic, and other water-soluble fatty acids and phosphoric acid. An especially suitable catalyst is glacial acetic acid containing dissolved therein about 10% of one of the above-mentioned metal halides, particularly zinc chloride. Halogenated acids such as monochloracetic acid and dichloracetic acid, may also be used in place of the acetic acids to provide catalysts of greater activity. It being preferable in this case to use only about 1% of metal halides, such as zinc chloride, dissolved therein.

Such catalyst combinations as the acetic acid-zinc chloride solution permit better control of the reaction and are generally used at somewhat higher temperatures; for example, the reaction may suitably be controlled by boiling under reflux. In such operations the temperature varies from about 105 to 115° C., depending upon the nature of the hydrocarbon reagents and of the catalyst. The time of heating is determined by the rate of reaction and the melting point desired.

The relative amounts of zinc chloride and of acetic acid may also vary widely, the acetic acid being preferably used in the major proportion and the zinc chloride in about 8 to 20% of the total of these two components. Proportions of zinc chloride below 10% give a relatively slower reaction rate, while higher proportions cause increased color formation. The zinc chloride should be dissolved, hence the solubility limit of zinc chloride in the acid used should not be exceeded.

The acetic acid is preferably used in an amount greater than the sum of the aromatic hydrocarbons and the aldehyde. Decreasing the ratio of acetic acid results in a softer product, other conditions being equal.

Other water-soluble fatty acids, such as propionic and butyric acid may be used in place of the acetic acid, with somewhat slower reaction rates.

The aromatic hydrocarbons and the aldehyde are used preferably in about equimolal proportions. The use of a smaller proportion of formaldehyde results in a decreased yield of a softer product. The use of a larger proportion of formaldehyde should be accompanied by a corresponding increase in the amount of acetic acid, and results in a higher yield of a harder product.

The amount of the phenols used may also vary widely, for example, the phenol may be from 10 to 90% of the total reagents.

The preparations described in Examples I and II were conducted with aqueous formaldehyde, or formalin. Anhydrous aldehydes, such as gaseous formaldehyde or paraformaldehyde, may also be used, and are preferred when using the acetic acid-zinc chloride catalyst combinations described above. When supplying the formaldehyde in gaseous form, the rate of reaction has been found to be much slower, but the product obtained is generally equal in quality to that obtained when using solid paraformaldehyde. Other aldehydes, such as acetaldehyde, may also be used.

The resins of the present invention can be made in wide variety ranging from heavy viscous oils, which may be used in rubber compounding, adhesives, plastic compounds, and fly paper, to hard solids of high melting point, which find application in surface coating compositions, cast and moulded articles, such as enamels, varnishes, pipe coatings, inks, waterproofing, insulating compounds, and floor tile.

This invention is not to be limited by any specific examples or other explanations which have been presented herein, as all of these are intended solely for purpose of illustration, but is to be limited only by the following claims in which it is desired to claim all novelty insofar as the prior art permits:

I claim:

1. Process for preparing a resin comprising reacting an aromatic petroleum hydrocarbon boiling above approximately 125° C. with an aldehyde in the presence of an acid condensation catalyst to form a condensation product uncombined with a phenol, then reacting the resulting condensation product with a phenol and an additional portion of an aldehyde.

2. Process for preparing a resin comprising reacting an aromatic petroleum hydrocarbon boiling above approximately 125° C. and an aldehyde in the presence of an acid condensation catalyst to form an intermediate condensation product uncombined with a phenol, then adding a phenol and an additional portion of an aldehyde and completing the condensation.

3. Process according to claim 2 in which said aromatic hydrocarbon is an aromatic fraction of petroleum, boiling within the approximate limits of about 125 and 275° C.

4. Process according to claim 2 in which said aldehyde is a formaldehyde.

5. Process for preparing a soluble and fusible resin comprising bringing an aromatic petroleum fraction boiling between 125 and 275° C. into reaction with formaldehyde in the presence of an acid condensation catalyst at a temperature of about 80° C. to about 115° C. to produce an intermediate condensation product uncombined with a phenol, then adding a phenol and bringing it into reaction with the said intermediate condensation product and a further, subsequently added, portion of formaldehyde, thereby obtaining a phenol modified resin.

6. Process according to claim 5 in which the said condensation catalyst is sulfuric acid.

7. Process according to claim 5 in which the said phenol is an alkyl phenol.

8. Resin prepared according to the process of claim 1.

9. Resin prepared according to the process of claim 2.

10. Resin prepared according to the process of claim 5, soluble in benzene, fusible, and at least partially soluble in drying oils.

11. Resin prepared according to the process of claim 5 in which the said phenol used therein is an alkyl phenol, said resin being fusible, soluble in benzene and in drying oils.

12. The process for preparing a resin comprising the steps of chemically condensing an aromatic petroleum hydrocarbon boiling above approximately 125° C. with an aldehyde in the presence of an acid condensation catalyst and in the absence of a phenol to form a condensation product, combining a phenol with said product, and thereafter condensing a further portion of aldehyde with the combined product, said aromatic hydrocarbon and aldehyde being condensed in about equimolal proportions and the phenol being 10 to 90% of the total reactants.

13. The process of preparing a resin comprising the steps of extracting an aromatic petroleum fraction by solution with liquid sulphur dioxide, distilling the fraction to produce a cut boiling between 132° and 142° C., reacting said cut with formalin in the presence of an acid condensation catalyst to form a condensation product uncombined with a phenol, combining therewith a portion of phenol, and then reacting the mixture with a further portion of formaldehyde.

14. The process of preparing a resin comprising the steps of extracting an aromatic petroleum fraction by solution with liquid sulphur dioxide, distilling the fraction to produce a cut boiling between 132° and 142° C., reacting about 2 volumes of said cut with about 1 volume of formalin in the presence of an acid condensation catalyst for a sufficient time to complete the reaction of the formalin, combining therewith a portion of phenol approximately half the quantity by volume of petroleum aromatic fraction in said reacted cut, and then reacting the mixture with a further portion of formaldehyde.

15. The process of preparing a resin comprising the steps of extracting an aromatic petroleum fraction by solution with liquid sulphur dioxide, distilling the fraction to produce a cut boiling between 132° and 142° C., reacting about 2 volumes of said cut with about 1 volume of formalin in the presence of sulfuric acid for a sufficient time to complete the reaction of the formalin, combining therewith a portion of phenol approximately half the quantity by volume of petroleum aromatic fraction in said reacted cut, and then reacting the mixture with a further portion of formaldehyde, separating an ether soluble fraction therefrom, and distilling off the ether to produce a benzene soluble, partially tung oil soluble, resin.

16. The process of preparing a resin comprising the steps of extracting an aromatic petroleum fraction by solution with liquid sulphur dioxide, distilling the fraction to produce a cut boiling between 132° and 142° C., chemically condensing said cut with formalin in the presence of an acid condensation catalyst to form a condensation product uncombined with a phenol, combining therewith a portion of tertiary amyl phenol, and then reacting the mixture with a further portion of formaldehyde.

17. In the process for preparing a resin the steps comprising condensing an aromatic petroleum hydrocarbon boiling above approximately 125° C. with an aldehyde in the presence of an acid condensation catalyst to form a condensation product uncombined with a phenol, then condensing the resulting aldehyde-aromatic hydrocarbon condensation product with a phenol in the presence of an aldehyde.

RAPHAEL ROSEN.